March 28, 1967     L. WITTROCK     3,310,837

PLASTICIZING DEVICE FOR EXTRUSION OR INJECTION MOLDING

Filed Aug. 24, 1965     2 Sheets-Sheet 1

INVENTOR:
LUDWIG WITTROCK

BY

*Karl F. Ross*

ATTORNEY.

March 28, 1967 L. WITTROCK 3,310,837
PLASTICIZING DEVICE FOR EXTRUSION OR INJECTION MOLDING
Filed Aug. 24, 1965 2 Sheets-Sheet 2

INVENTOR:
LUDWIG WITTROCK
BY
Karl G. Ross
ATTORNEY.

United States Patent Office 3,310,837
Patented Mar. 28, 1967

3,310,837
PLASTICIZING DEVICE FOR EXTRUSION OR INJECTION MOLDING
Ludwig Wittrock, Marl, Germany, assignor to Gewerkschaft Schalker Eisenhütte, Gelsenkirchen-Schalke, Germany, a corporation of Germany
Filed Aug. 24, 1965, Ser. No. 482,215
Claims priority, application Germany, Dec. 6, 1961, G 33,760; Sept. 8, 1962, G 35,883
4 Claims. (Cl. 18—12)

This application is a continuation-in-part of my co-pending application Ser. No. 242,799, filed December 6, 1962 (now abandoned). My present invention relates to a plasticizing and force-feeding device of the type disclosed in my U.S. Patent No. 3,043,480, issued July 10, 1962, adapted to supply extrusion presses or injection-molding machines with liquefied plastic material.

In my aforementioned patent I have disclosed a device of this type in which a central feed screw meshes with a surrounding array of planetary feed screws in order to knead and masticate the introduced powdered or granular molding material and to convey it toward a discharge opening. The tubular housing containing the several feed screws is generally heated to help soften the plastic material to be liquefied.

The threads of the central and planetary feed screws form channels between which the plastic material is propelled under pressure toward the outlet by virtue of the intermeshing of these threads and also, advantageously, by the engagement of the threads of the planetary feed screws with a complementary thread on the inner housing wall. Between adjacent planetary feed screws there exist, however, axial passages through which some material advances without being subject to the kneading and masticating action of intermeshing threads. Moreover, the motion of the mass through these spaces is irregular, turbulent and wasteful of applied energy. Also, these spaces impede thermal conduction from the external heating mantle to all portions of the flow of plastic material.

It is, therefore, the principal object of my present invention to provide means for remedying the deficiencies noted above whereby, owing to the improved thermal and mechanical efficiency of the device, its dimensions and its power input may be reduced for a given output rate.

This object is realized, in accordance with my instant invention, by the provision of spacer bars which occupy the passages existing between adjacent planetary feed screws so as to block the movement of insufficiently plasticized material toward the discharge end of the structure and to insure a substantially uniform advance of the mass along the housing axis by way of the channels formed between successive crests of the screw threads. These bars are preferably metallic, like the housing and feed screws adjoining them, in order to act as good conductors of heat. They may be coextensive with the planetary feed screws or somewhat shorter than the latter but, in any event, should be long enough to insure that the plastic material cannot bypass the locations at which the threads of the planetary feed screws mesh with those of the central feed screw and/or of the housing 3. For this purpose each bar should extend over two or more crests of the adjoining threads; moreover, the spacing of the cylindrically curved bar surfaces from the crests of the threads coaxial therewith should be as small as possible without generating excessive friction and, in general, will be less than the depth of the thread.

Although the pitch of the threads may vary as taught in my earlier patent, I prefer to use a pitch angle of about 45° throughout.

The four-sided profile of each spacer bar is defined by two concentrically curved cylindrical surfaces and two cylindrically concave lateral surfaces. The inner and outer concentric surfaces confine the plastic material to the thread channels of the central screw and the housing, respectively, while the lateral surfaces do the same for the adjoining feed screws. At the discharge end of the screw assembly, all the channels merge into a common outlet. Since heat is applied to the mass through the housing wall, the material passing through the outer channel will have the highest temperature, and therefore the greatest fluidity, whereas the material traversing the inner channel will be the coldest and the most viscous. The heating means should therefore be adjusted to maintain an optimum temperature in the region of the lateral channels. As the mass discharged from these lateral channels blends with the material coming from the two concentric channels, the temperature and viscosity of the resultant mixture in the outlet will be at an optimum only if the cross-sections of the several channels will bear a certain relationship with one another. I have found, in accordance with an important feature of this invention, that operating conditions are optimized if the sum of the arc lengths of the two concentric channels substantially equals the sum of the arc lengths of the two lateral channels. This can also be expressed in terms of the pitch diameters of the respective screw threads, with the sum of the pitch diameters, or radii, of the central feed screw and of the threaded housing wall substantially equaling the sum of the pitch diameters of all the planetary screws, or the respective radii.

The closeness of the spacer bars to the relatively rotating screw threads insures that virtually the entire fluid mass is positively displaced by the axial component of the motion of the helical ridges defining these threads whereby a maximum conversion of input power to output velocity is insured.

The invention will be described in greater detail with reference to the accompanying drawing in which.

Figure 1:
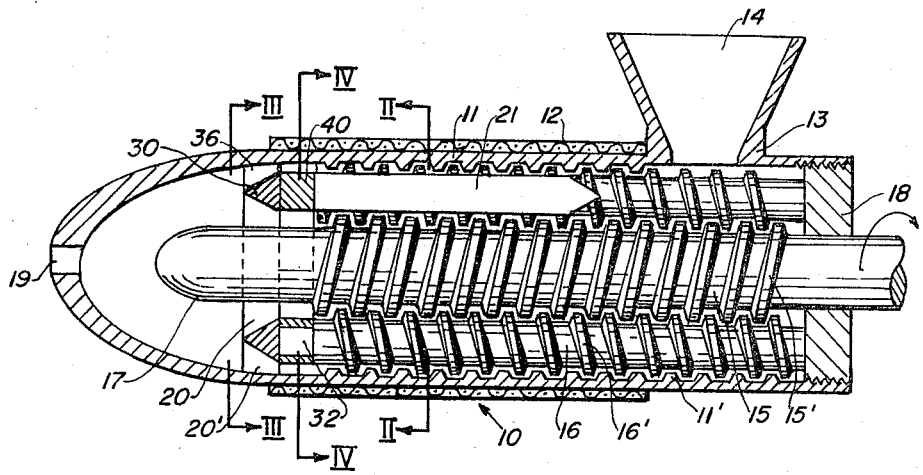
FIG. 1 is an axial sectional view, on the line I—I of FIG. 2, of a device according to the invention adapted to feed an extrusion press.

In FIGS. 1–4 I have shown a plasticizing device 10 comprising a generally cylindrical housing 11 which is surrounded by a heating mantle 12. The housing 11 is formed with a lateral boss 13 constituting a hopper which leads to an inlet port 14 near the rear end of the housing bore. This bore is occupied by a central feed screw 15 whose helical thread 15' meshes with complementary threads 16' of an array of planetary feed screws 16. The inner housing wall is also threaded at 11', as disclosed in my above-identified patent, and in mating engagement with the planetary feed screws 16. These feed screws are held against axial displacement by a forwardly positioned guide ring 30, fixedly supported from housing 11 by peripherally spaced stays 36, and a closure cap 18 threadedly inserted into the rear end of the housing bore. The front of the housing is formed with an outlet 19 communicating, via annular clearances 20, 20' formed around ring 30 between the housing and the head 17 of screw 15, with the terminations of the threads 16' of planetary feed screws 16 whose unthreaded forward ends are journaled in a mounting ring 40 rotatably adjoining the guide ring 30.

The spaces formed between adjacent planetary feed screws 16 are occupied, substantially throughout their cross-sections, by spacer bars 21 which are rigidly secured to ring 40 and terminate at the rear just ahead of the location of inlet port 14. These spacer bars 21, accordingly, block the direct flow of plastic material from the hopper 13 to the clearances 20, 20' and thence to the outlet 19; it will be apparent that any such material lodged within the threads 16' of feed screws 16 will be carried successively into contact with the thread 15' of central feed screw 15 and the thread 11' of housing 11 before being discharged into the outlet 19. Thorough kneading and mastication of the plastic material is thereby insured, the material advancing uniformly along the bars 21 and being at the same time brought to the necessary high temperature by the heating mantle 12 which surrounds the metallic housing 11. It will be apparent that a path of good thermal conductivity is formed by the metallic spacer bars 21 as they contact broad areas of the threaded housing and screw peripheries 11', 15' and 16'. Rotation, in the direction of arrow 22, is imparted to central feed screw 15 by suitable driving means not shown.

Figure 2:
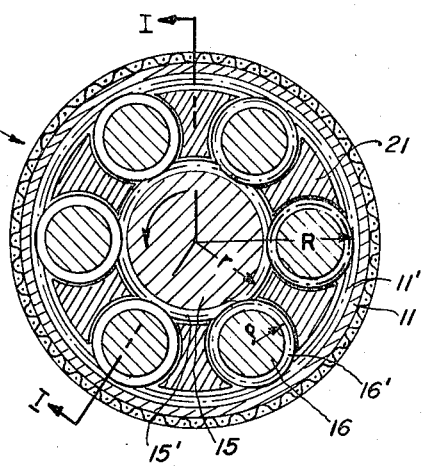
FIG. 2 is a cross-sectional view taken on line II—II of FIG. 1.
Figure 3:
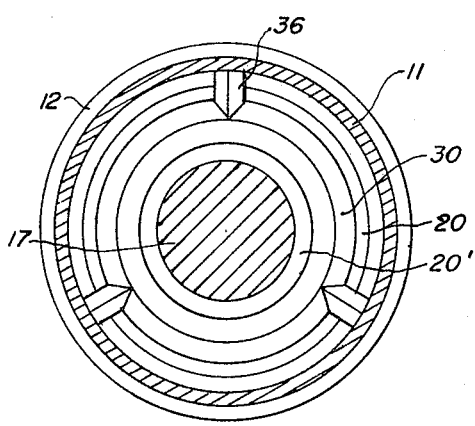
FIGS. 3 and 4 are cross-sectional views taken, respectively, on lines III—III and IV—IV of FIG. 1.

In FIG. 2 I have indicated at $r$ the pitch radius of the thread 15' of the central feed screw 15, at $R$ the corresponding radius of housing thread 11'; the pitch radius of the threads 16' of the planetary screws 16 has been designated $\rho$. For the reasons set forth above, and in accordance with a feature of this invention, these radii are so chosen that, at least approximately, $r+R=n\rho$ where $n$ is the number of planetary screws (here six).

The following table gives representative values of the pitch radii of a variety of plasticizing and feeding devices according to my invention, with different numbers of planetary feed screws; the numerical values may be in millimeters or any other suitable unit of length. Naturally, the system must also satisfy the relationship $R=r+2\rho$ which follows the geometry of the arrangement.

| $n$ | $r$ | $\rho$ | $R$ | $r+R$ | $n\rho$ |
|---|---|---|---|---|---|
| 6 | 80 | 40 | 160 | 240 | 240 |
| 8 | 187 | 62.5 | 312 | 499 | 500 |
| 12 | 311 | 62.5 | 436 | 747 | 750 |
| 16 | 435 | 62.5 | 560 | 995 | 1,000 |

Figure 5:
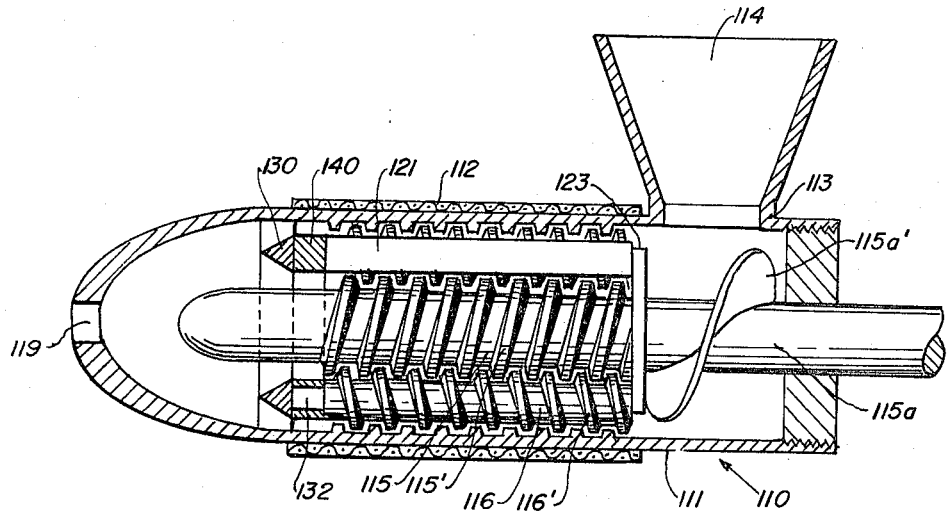
FIG. 5 is a view similar to FIG. 1, showing a modification.
Figure 4:
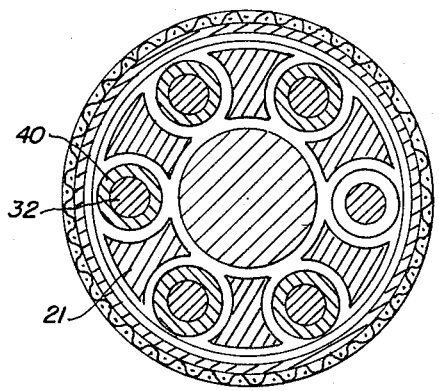

The device 110 illustrated in FIG. 5 is generally similar to device 10, except for the fact that its central feed screw 115 is formed with a rearward extension 115a which projects beyond the planetary feed screws 116 and carries a worm-type thread 115a' constituting a large-diameter continuation of thread 115'. A collar 123 forms an annular abutment for the assembly of feed screws 116 and spacer bars 121 which is confined between the collar and the front rings 130, 140; a mounting ring similar to ring 140, interconnecting the spacer bars 121 and having the screws 116 journaled therein, could of course be also provided at the rear end of the assembly, just ahead of collar 123. It will be noted that, in this embodiment, the bars 121 are substantially coextensive with the planetary feed screws 116. The boss 113 of housing 111 has been disposed further to the rear so as to register with the worm-shaped screw extension 115a acting as a distributor for the material unthreaded through inlet 114; heating mantle 112 terminates, again, ahead of outlet 119. Otherwise, the two embodiments are identical and operate in essentially the same manner; the aforestated rules for the dimensioning of the pitch diameters apply also in this case.

I claim:

1. A plasticizing and feeding device for the discharge of moldable plastic material, comprising a generally cylindrical housing with an inlet for said material and an outlet therefor, said housing being provided with internal teeth forming a helical thread thereon between said inlet and said outlet, a central feed screw with a peripheral helical thread matching that of said housing, a plurality of planetary feed screws with complementary helical threads matingly engaging the threads of said central feed screw and said housing, said planetary feed screws being disposed in an annular clearance between said central feed screw and said housing with peripheral spacing from one another, drive means for rotating said central feed screw, a plurality of spacer bars occupying the spaces between adjoining planetary feed screws over at least part of their length for substantially blocking the flow of said material through said spaces except by way of helical channels defined by said threads upon rotation of said feed screws by said drive means, and means for heating said housing at least in the region of said bars, the pitch radius $r$ of the thread of said central feed screw, the pitch radius $\rho$ of the threads of said planetary feed screws and the pitch radius $R$ of the thread of said housing being proportioned substantially in conformity with the relationships $R+r=n\rho$ and $R=r+2\rho$, $n$ being the number of said planetary feed screws.

2. A device as defined in claim 1, further comprising linking means joining said planetary feed screws and said bars into a tubular unit surrounding said central feed screw.

3. A device as defined in claim 2 wherein said linking means comprises at least one rotatable ring secured to an end of said bars and having said planetary feed screws journaled therein.

4. A device as defined in claim 1 wherein said bars consist of a material of good thermal conductivity.

References Cited by the Examiner

UNITED STATES PATENTS

| 2,581,451 | 1/1952 | Sennet. |
| 2,754,542 | 7/1956 | Henning et al. |
| 2,802,238 | 8/1957 | Colombo _____ 18—12 |
| 3,043,480 | 7/1962 | Wittrock. |

FOREIGN PATENTS

| 955,942 | 4/1964 | Great Britain. |

WILLIAM J. STEPHENSON, *Primary Examiner.*